(12) United States Patent
Zou

(10) Patent No.: US 10,065,645 B2
(45) Date of Patent: Sep. 4, 2018

(54) VEHICLE DRIVING SYSTEM AND METHOD FOR CONTROLLING THE SAME

(71) Applicant: Robert Bosch GmbH, Stuttgart (DE)

(72) Inventor: Haibin Zou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 14/844,791

(22) Filed: Sep. 3, 2015

(65) Prior Publication Data

US 2016/0068159 A1    Mar. 10, 2016

(30) Foreign Application Priority Data

Sep. 4, 2014   (CN) .......................... 2014 1 0448562

(51) Int. Cl.
*B60W 10/02*        (2006.01)
*B60W 30/18*        (2012.01)
(Continued)

(52) U.S. Cl.
CPC .......... *B60W 30/18* (2013.01); *B60L 11/1805* (2013.01); *B60W 10/02* (2013.01); *B60W 10/08* (2013.01); *B60W 30/14* (2013.01); *B60W 30/18027* (2013.01); *F16D 48/06* (2013.01); *B60K 1/02* (2013.01); *B60K 7/0007* (2013.01); *B60K 17/02* (2013.01); *B60K 2001/001* (2013.01); *B60W 2560/00* (2013.01); *B60W 2710/02* (2013.01); *B60W 2710/08* (2013.01); *F16D 2500/1064* (2013.01); *F16D 2500/1066* (2013.01); *F16D 2500/3067* (2013.01); *F16D 2500/508* (2013.01); *F16D 2500/7041* (2013.01); *F16D 2500/70408* (2013.01); *F16D 2500/70454* (2013.01); *Y02T 10/7258* (2013.01)

(58) Field of Classification Search
None
See application file for complete search history.

(56) References Cited

U.S. PATENT DOCUMENTS 5,887,670 A * 3/1999 Tabata .................. B60K 6/365
                                                180/65.1
6,116,363 A * 9/2000 Frank ...................... B60K 6/48
                                                180/65.25

(Continued)

FOREIGN PATENT DOCUMENTS

JP    2009-89597 A    4/2009
JP    2009-95230 A    4/2009

*Primary Examiner* — Truc M Do
(74) *Attorney, Agent, or Firm* — Maginot, Moore & Beck LLP

(57) ABSTRACT

A vehicle driving system comprises a first motor, a second motor, a clutching mechanism disposed between a first rotary shaft of the first motor and a second rotary shaft of the second motor and configured to engage the first rotary shaft with the second rotary shaft or disengage the first rotary shaft from the second rotary shaft, a control unit connected with the first motor, the second motor and the clutching mechanism and a sensor connected with the control unit and configured to sense a travelling status of the vehicle. The control unit is configured to determine and control an operation mode the clutching mechanism and/or an operation mode and a load of the first motor and the second motor based on a signal outputted from the sensor and representing the travelling status of the vehicle.

13 Claims, 2 Drawing Sheets

(51) Int. Cl.
  *B60L 11/18* (2006.01)
  *B60W 10/08* (2006.01)
  *B60W 30/14* (2006.01)
  *F16D 48/06* (2006.01)
  *B60K 1/02* (2006.01)
  *B60K 7/00* (2006.01)
  *B60K 17/02* (2006.01)
  *B60K 1/00* (2006.01)

(56) References Cited

U.S. PATENT DOCUMENTS

| | | | |
|---|---|---|---|
| 6,380,640 B1* | 4/2002 | Kanamori | B60K 6/44 290/40 C |
| 2003/0104901 A1* | 6/2003 | Fukushima | B60K 6/36 477/3 |
| 2004/0209732 A1 | 10/2004 | Eguchi et al. | |
| 2005/0176543 A1* | 8/2005 | Kirkwood | B60K 17/35 475/5 |
| 2006/0162980 A1* | 7/2006 | Bowen | B60K 17/3462 180/247 |
| 2006/0199697 A1* | 9/2006 | Kirkwood | B60K 17/3467 477/5 |
| 2007/0216327 A1* | 9/2007 | Sugita | B60L 11/12 318/269 |
| 2007/0275819 A1* | 11/2007 | Hirata | B60K 6/365 477/5 |
| 2008/0182712 A1* | 7/2008 | Kira | B60K 6/26 477/7 |
| 2009/0082171 A1* | 3/2009 | Conlon | B60K 6/365 477/5 |
| 2009/0171523 A1* | 7/2009 | Luo | B60W 20/40 701/22 |
| 2010/0025131 A1* | 2/2010 | Gloceri | B60G 3/20 180/65.28 |
| 2010/0256850 A1* | 10/2010 | Sakata | B60K 6/365 701/22 |
| 2011/0297466 A1* | 12/2011 | Swales | B60K 6/383 180/65.25 |
| 2013/0030638 A1* | 1/2013 | Nissato | B60K 6/442 701/22 |
| 2013/0166127 A1* | 6/2013 | Nishinakamura | B60W 10/02 701/22 |
| 2013/0253744 A1* | 9/2013 | Nishimine | B60W 10/08 701/22 |
| 2014/0135169 A1* | 5/2014 | Rossey | B60K 1/00 477/9 |
| 2014/0235402 A1* | 8/2014 | Matsubara | B60K 1/00 477/8 |
| 2016/0129811 A1* | 5/2016 | Zing | B60L 15/2045 701/22 |
| 2016/0159343 A1* | 6/2016 | Hata | B60K 6/387 477/5 |
| 2016/0176395 A1* | 6/2016 | Hata | B60W 20/40 701/22 |

* cited by examiner

VEHICLE DRIVING SYSTEM AND METHOD FOR CONTROLLING THE SAME

This application claims priority under 35 U.S.C. § 119 to patent application no. CN 201410448562.2 filed on Sep. 4, 2014 in China, the disclosure of which is incorporated herein by reference in its entirety.

TECHNICAL FIELD

The disclosure relates to a vehicle driving system, especially an electric driving system for a vehicle and a method for controlling the same.

BACKGROUND

In vehicles such as electric vehicles or hybrid vehicles, it is necessary to use electrically driven motors to drive the wheels of the vehicles. A driving system which includes electrically driven motors usually has two types. The first type is a central driving system which also includes two cases: one case uses one motor with one speed gearbox, a driving system with such configuration usually has low efficiency; the other case uses one motor with two or more speed gearboxes, a driving system with such configuration has not only high cost, but also poor controllability of the vehicle. The second type is a direct driving system which also includes two cases: one case uses four motors to respectively and independently drive four wheels of the vehicle directly, a driving system with such configuration has not only high cost but also poor durability and safety; the other case uses four motors together with four speed gearboxes to respectively independently drive four wheels of the vehicle directly, a driving system with such configuration not only has high cost and low efficiency but also can not be integrated with the wheels due to its huge volume. Recently, some combined driving systems have been developed based on the central driving system and the direct driving system, however, the problem of low efficiency, high cost or poor safety still remains.

Therefore, it is necessary to improve the current vehicle driving system and the method for controlling the same.

SUMMARY

An object of the disclosure is to overcome at least one of defects in the above mentioned prior art, and to provide a vehicle driving system and a method for controlling the same. The vehicle driving system according to the disclosure not only has a high efficiency, safety and controllability but a small volume and a low cost.

Thus, according to one aspect of the disclosure, a vehicle driving system is provided, comprising:
  a first motor;
  a second motor;
  a clutching mechanism disposed between a first rotary shaft of the first motor and a second rotary shaft of the second motor and configured to engage the first rotary shaft with the second rotary shaft or disengage the first rotary shaft from the second rotary shaft;
  a control unit connected with the first motor, the second motor and the clutching mechanism; and
  a sensor connected with the control unit and configured to sense a travelling status of the vehicle;
  wherein the control unit being configured to determine and control an operation mode of the clutching mechanism and/or an operation mode and a load of the first motor and the second motor based on a signal outputted from the sensor and representing the travelling status of the vehicle.

Preferably, an output power and an output torque of the first motor are larger than an output power and an output torque of the second motor, the control unit determines and controls only the first motor to operate in a driving mode, the first motor and the second motor together to operate in a driving mode, only the first motor to operate in a generating mode, or the first motor and the second motor together to operate in a generating mode.

Preferably, the control unit determines and controls the clutching mechanism to operate in an engaging, sliding or disengaging mode.

Preferably, the first motor and the second motor have a common housing.

Preferably, a plurality of cooling fluid channels are formed in the housing in order to allow cooling fluid to pass therethrough during the operation of the vehicle driving system.

Preferably, the vehicle driving system further comprises a first torque damping component located in the housing and disposed on the first rotary shaft near its output end, and a second torque damping component located in the housing and disposed on the second rotary shaft near its output end.

Preferably, the vehicle is an electric vehicle or a hybrid vehicle.

According to another aspect of the disclosure, a method for controlling the vehicle driving system as mentioned above comprises:
  determining and controlling by the control unit an operation mode of the clutching mechanism and/or an operation mode and a load of the first motor and the second motor based on a signal outputted from the sensor and representing the travelling status of the vehicle.

Preferably, when the sensor senses the vehicle to be in a drive-off and a straight line acceleration phase, the control unit controls the clutching mechanism to operate in an engaging mode so that two driving wheels of the vehicle are synchronized; and
  when the sensor senses the vehicle to be in a turning phase or a phase of travelling on a bisectional road (i.e. a road on which the wheels at two sides of the vehicle has different adhesion coefficient), the control unit controls the clutching mechanism to operate in a sliding and/or disengaging mode so that two driving wheels of the vehicle are unsynchronized.

Preferably, when the sensor senses the vehicle to be in a drive-off, acceleration and constant speed cruise phase under an urban traffic situation, the control unit controls only one of the first motor and the second motor to operate in a driving mode;
  when the sensor senses the vehicle to be in a braking phase of low speed travelling under the urban traffic situation, the control unit controls only one of the first motor and the second motor to operate in a generating mode to brake the vehicle and to recover energy during the braking phase; and
  when the sensor senses the vehicle to be in a braking phase of middle and high speed travelling under the urban traffic situation, the control unit controls the first motor and the second motor together to operate in a generating mode to brake the vehicle and to recover energy during the braking phase.

Preferably, when only one motor operates in a driving mode or generating mode, the motor is one of the first motor and the second motor which has a larger output power and output torque.

According to the disclosure, the control unit determines and controls the operation mode of the clutching mechanism, and the operation mode and the load of the first motor and the second motor, whereby the vehicle driving system not only has a high efficiency, safety and controllability but a small volume and a low cost.

DETAILED DESCRIPTION

Various preferred embodiments of the disclosure will be described in detail hereinafter in combination with examples. A person skilled in the art shall understand that the embodiment herein is exemplary, and it does not mean to impose any limitation on the disclosure.

Figure 1:
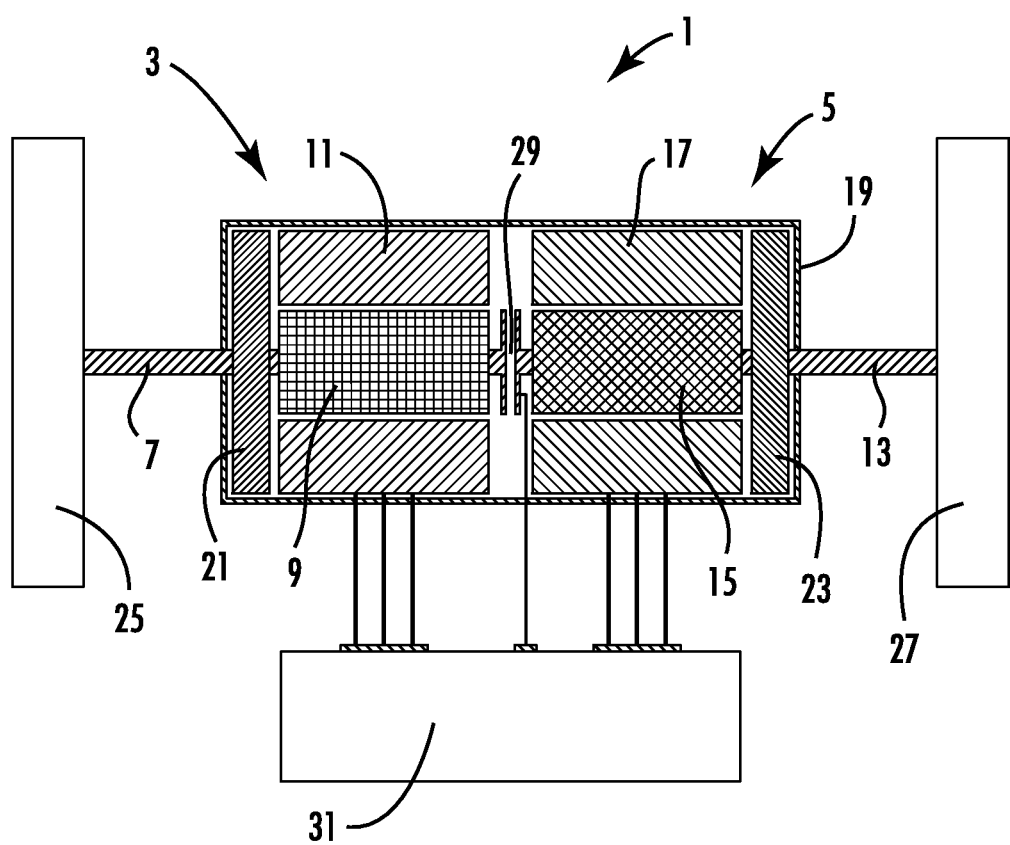
FIG. 1 is an illustration of the vehicle driving system according to the disclosure.

FIG. 1 is an illustration of the vehicle driving system according to the disclosure. A vehicle driving system 1 according to the disclosure comprises a first motor 3 and a second motor 5. The first motor 3 includes a first rotor 9 and a first stator 11. The first rotor 9 which includes a first rotary shaft 7 is able to rotate in the first stator 11. The second motor 5 includes a second rotor 15 and a second stator 17. The second rotor 15 which includes a second rotary shaft 13 is able to rotate in the second stator 17. The first rotary shaft 7 and the second rotary shaft 13 are preferably solid and rigid. Although the first motor 1 and the second motor 5 can have an individual housing to package their respective rotor and stator, the first motor 3 and the second motor 5 preferably have a common housing 19 to package the first rotor 9, the first stator 11, the second rotor 13 and the second stator 17. The housing 19 preferably has a plurality of cooling fluid channels (not shown) formed therein in order to allow cooling fluid to pass therethrough during the operation of the vehicle driving system, thereby cooling heating components during the operation of the first motor 3 and the second motor 5. Preferably, the first motor 3 further comprises a first torque damping component 21 located in the housing 19 and disposed on the first rotary shaft 7 near its output end, and the second motor 5 further comprises a second torque damping component 23 located in the housing 19 and disposed on the second rotary shaft 13 near its output end. When the vehicle runs, the first torque damping component 21 and the second torque damping component 23 inhibit vibration generated by the first motor 3 and the second motor 5 so that the vehicle can travel more steadily. The output end of the first rotary shaft 7 of the first motor 3 can be mounted with a wheel 25 of the vehicle, while the output end of the second rotary shaft 13 of the second motor 5 can be mounted with another wheel 27 of the vehicle.

The vehicle driving system 1 further comprises a clutching mechanism 29 disposed between the first rotary shaft 7 of the first motor 3 and the second rotary shaft 13 of the second motor 5 and configured to engage the first rotary shaft 7 with the second rotary shaft 13 or disengage the first rotary shaft 7 from the second rotary shaft 13. The clutching mechanism 29 can operate in an engaging, sliding or disengaging mode.

The vehicle driving system 1 further comprises a control unit 31 connected with the first motor 3, the second motor 5 and the clutching mechanism 29. The control unit 31 is an integrated unit of a motor control board, a driving board for controlling the current supplied to the motor, a vehicle control board and a clutching mechanism control board. The vehicle driving system 1 also further comprises a sensor (not shown) connected with the control unit 31 and configured to sense a travelling status of the vehicle. Based on a signal outputted from the sensor and representing the travelling status of the vehicle, the control unit 31 determines and controls an operation mode and a load of the first motor 3 and the second motor 5 and/or an operation mode of the clutching mechanism 29, whereby ensuring to meet the demands of the vehicle during travelling and consume the minimum energy in the meantime.

The output power and output torque of the vehicle driving system 1 according to the disclosure vary with the travelling status of the vehicle. Usually, the vehicle travels under an urban traffic situation for most of the time in daily use. Under such traffic situation, the travelling speed of the vehicle is typically below, for example, 80 KM/hour. However, under a rural traffic situation, the travelling speed of the vehicle can reach, for example, 80-120 KM/hour or even higher. Although, in the disclosure, the first motor 3 and the second motor 5 can be set to be the same as each other, thus having the same output power and output torque, it is preferred that the output power and output torque of one of the motors are higher than the output power and output torque of the other, and the motor with higher output power and output torque is mainly used while travelling under the urban traffic situation. In order to facilitate description, it is assumed in the disclosure that the output power and output torque of the first motor 3 are higher than the output power and output torque of the second motor 5.

The method for controlling the vehicle driving system according to the disclosure will be described hereinafter with reference to FIG. 2 and FIG. 3.

Figure 2:
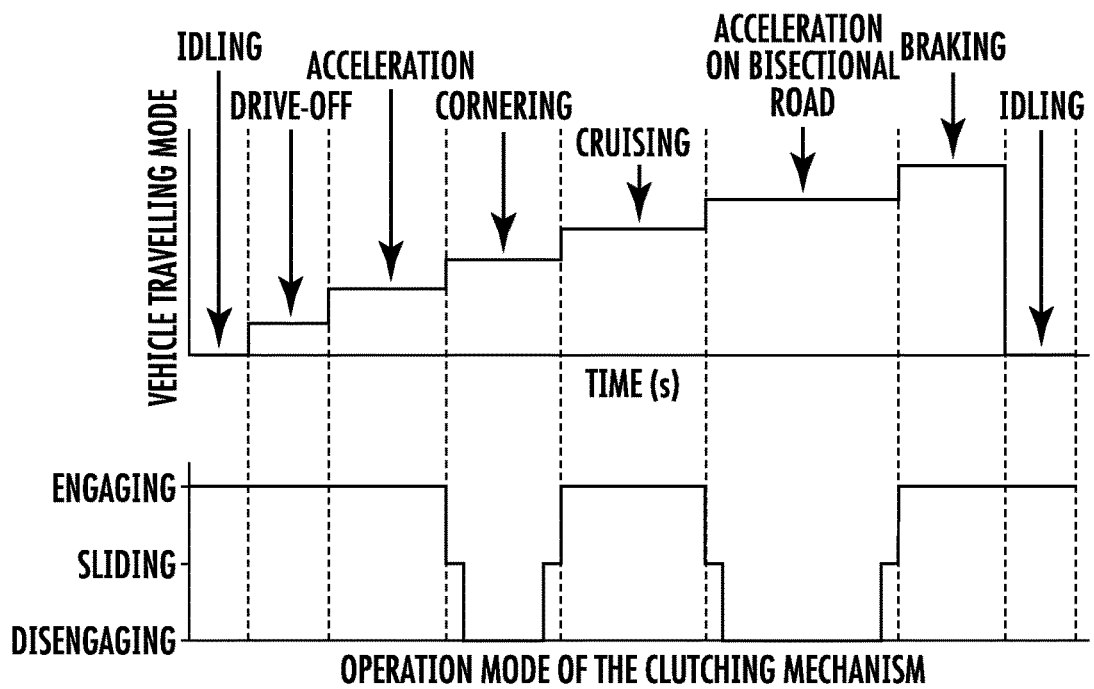
FIG. 2 schematically shows the operation mode of the clutching mechanism under certain travelling status.

FIG. 2 schematically shows the operation mode of the clutching mechanism under certain travelling status. As described above, the clutching mechanism 29 can operate in an engaging, sliding or disengaging mode. However, the clutching mechanism 29 is usually engaged. As shown in FIG. 2, in a drive-off and a straight line acceleration phase, the control unit 31 controls the clutching mechanism 29 to operate in the engaging mode such that the two driving wheels 25 and 27 are synchronized. When the vehicle turns while travelling, the speed of the two driving wheels 25 and 27 should be unsynchronized. Otherwise, one driving wheel of the vehicle may skid, putting the vehicle in great danger. Therefore, in this case, the control unit 31 controls the clutching mechanism 29 to operate in the sliding mode and then even in the disengaging mode. Thus, the first motor 3 and the second motor 5 will drive the corresponding driving wheel 25, 27 respectively to achieve an active stability of the vehicle, thereby improving the vehicle safety.

When the vehicle travels on a bisectional road, especially when accelerating, the two driving wheels 25 and 27 have different driving force in order to improve controllability, thus the two driving wheels 25 and 27 shall be unsynchronized. Otherwise, one driving wheel of the vehicle may skid, the vehicle is in poor controllability, and even worse, the vehicle is in great danger. In this case, depending on the traffic situation, the control unit 31 also controls the clutching mechanism 29 to operate in the sliding mode and then even in the disengaging mode. Usually, a bisectional road of short distance only results in the clutching mechanism 29 to operate in the sliding mode, while a bisectional road of long distance results in the clutching mechanism 29 to operate in the disengaging mode.

Apart from enhancing the efficiency of the driving system and improving the controllability of the vehicle, controlling the clutching mechanism 29 by the control unit 31 can also enhance the overall security level of the vehicle. For example, when one motor has a fault, can not operate or operate at an un-commanded torque condition, for example, one motor accelerates out of control, the clutching mechanism 29 needs to operate in the engaging mode to ensure that the vehicle is under a safe handling situation. The control unit 31 controls the clutching mechanism 29 to achieve a fail safe mode of the vehicle (i.e. a mode in which the vehicle can still travel safely when one or more components of the vehicle breaks down or fails) and accordingly the limp home mode can be realized for the vehicle.

Figure 3:
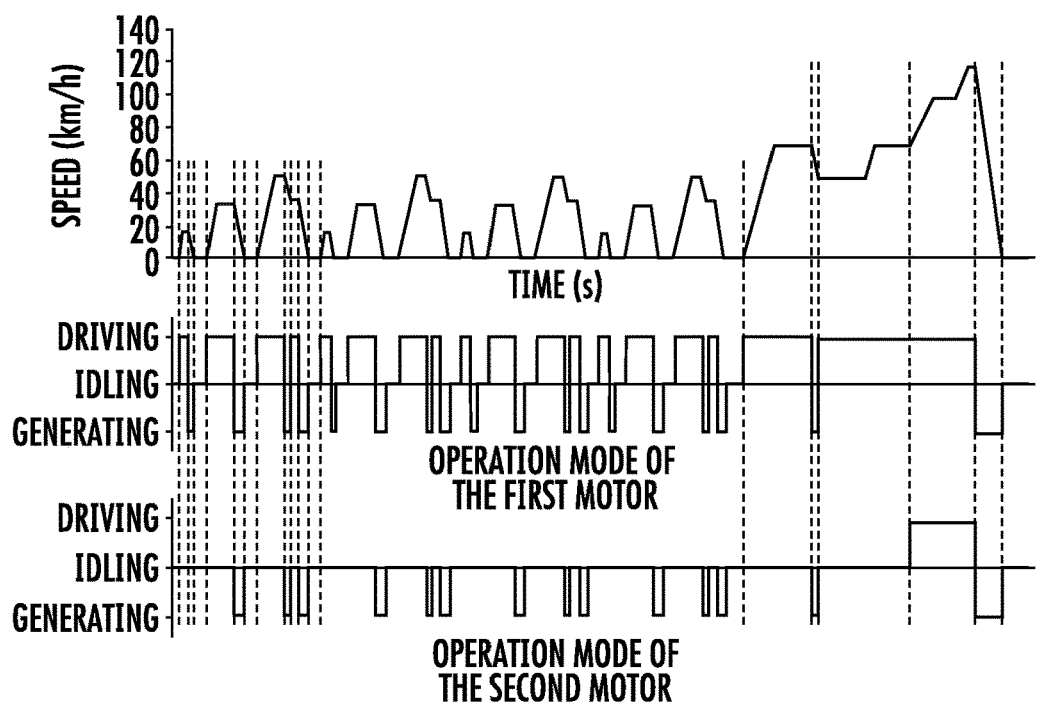
FIG. 3 schematically shows the operation mode of every motor under certain travelling status.

FIG. 3 schematically shows the operation mode of every motor under certain travelling status. As shown in FIG. 3, while travelling under the urban traffic situation, in a drive-off, acceleration and constant speed cruising phase of the vehicle, the control unit 31 controls only the first motor 3 to operate in a driving mode, in order to drive every driving wheel of the vehicle individually. In a braking phase of low speed travelling under the urban traffic situation, the control unit 31 controls only the first motor 3 to operate in a generating mode in a known way to brake the vehicle and to recover energy during the braking phase. In a braking phase of middle and high speed travelling under the urban traffic situation) the control unit 31 controls the first motor 3 and the second motor 5 together to operate in the generating mode in a known way to brake the vehicle and to recover energy during the braking phase.

While travelling under the rural traffic situation, in a low speed range of the vehicle, the control unit 31 controls only the first motor 3 to operate in the driving mode, in order to individually drive every driving wheel of the vehicle more efficiently. In a middle and high speed range of the vehicle, the control unit 31 controls the first motor 3 and the second motor 5 together to operate in the driving mode, in order to optimize the efficiency of the vehicle driving system. In a braking phase of travelling under the rural traffic situation, the control unit 31 controls the first motor 3 and the second motor 5 together to operate in the generating mode in a known way to brake the vehicle and to recover energy during the braking phase.

The disclosure has been described in detail above in combination with specific embodiments. It is obvious that the embodiments described above and illustrated in the appended drawings shall be understood to be exemplary, and impose no limitation on the disclosure. For a person skilled in the art, various variation or modification can be made without deviating from the spirits of the disclosure, all these variation or modification do not deviate from the scope of the disclosure.

The invention claimed is:

1. A vehicle driving system comprising:
   a first motor;
   a second motor;
   a clutching mechanism disposed between a first rotary shaft of the first motor and a second rotary shaft of the second motor and configured to selectively engage the first rotary shaft with the second rotary shaft and disengage the first rotary shaft from the second rotary shaft;
   a sensor configured to sense a travelling status of the vehicle; and
   a control unit connected to the sensor, the first motor, the second motor, and the clutching mechanism, the control unit being configured to:
      identify a traveling status of the vehicle based on a signal received from the sensor;
      control, in response to a first traveling status being identified, the clutching mechanism to operate in an engaging mode in which the first rotary shaft and the second rotary shaft are engaged;
      control, in response to the travelling status indicating one of (i) that the vehicle is accelerating while at speed less than a first predetermined threshold speed and (ii) that the vehicle is travelling at a constant speed less than the first predetermined threshold speed, at least while the clutching mechanism is operated in the engaging mode, only one of the first motor and the second motor to operate in a driving mode in which driving torque is applied; and
      control, in response to the travelling status indicating that the vehicle is braking while at a speed less than a second predetermined threshold speed, at least while the clutching mechanism is operated in the engaging mode, only one of the first motor and the second motor to operate in a generating mode in which energy is recovered by braking the vehicle.

2. The vehicle driving system according to claim 1, wherein the clutching mechanism is configured to operate in operation modes including:
   the engaging mode in which the first rotary shaft and the second rotary shaft are engaged,
   a sliding mode in which the first rotary shaft and the second rotary shaft are partially disengaged, and
   a disengaging mode in which the first rotary shaft and the second rotary shaft are disengaged.

3. The vehicle driving system according to claim 1, wherein:
   an output power and an output torque of the first motor are larger than an output power and an output torque of the second motor,
   when only one of the first motor and the second motor is to be operated in the driving mode, the first motor is operated in the driving mode, and
   when only one of the first motor and the second motor is to be operated in the generating mode, the first motor is operated in the generating mode.

4. The vehicle driving system according to claim 1, wherein the first motor and the second motor have a common housing.

5. The vehicle driving system according to claim 4, wherein:
   a plurality of cooling fluid channels are formed in the housing, and
   cooling fluid passes through the plurality of cooling fluid channels during operation of the vehicle driving system.

6. The vehicle driving system according to claim 4, further comprising:
   a first torque damping component located in the housing and disposed on the first rotary shaft near an output end of the first rotary shaft; and
   a second torque damping component located in the housing and disposed on the second rotary shaft near an output end of the second rotary shaft.

7. The vehicle driving system according to claim 1, wherein the vehicle is an electric vehicle or a hybrid vehicle.

8. A method for controlling a vehicle driving system including a first motor, a second motor, a clutching mechanism, a control unit, and a sensor, the method comprising:
   identify a traveling status of the vehicle based on a signal received from the sensor;
   controlling, with the control unit, in response to a first traveling status being identified, the clutching mechanism to operate in an engaging mode in which the first rotary shaft and the second rotary shaft are engaged;
   controlling, with the control unit, in response to the travelling status indicating one of (i) that the vehicle is accelerating while at speed less than a first predetermined threshold speed and (ii) that the vehicle is travelling at a constant speed less than the first predetermined threshold speed, at least while the clutching mechanism is operated in the engaging mode, only one of the first motor and the second motor to operate in a driving mode in which driving torque is applied; and
   controlling, with the control unit, in response to the travelling status indicating that the vehicle is braking while at a speed less than a second predetermined threshold speed, at least while the clutching mechanism is operated in the engaging mode, only one of the first motor and the second motor to operate in a generating mode in which energy is recovered by braking the vehicle,
   wherein the clutching mechanism is disposed between a first rotary shaft of the first motor and a second rotary shaft of the second motor and is configured to selectively engage the first rotary shaft with the second rotary shaft and disengage the first rotary shaft from the second rotary shaft,
   wherein the control unit is connected with the sensor, the first motor, the second motor, and the clutching mechanism, and
   wherein the sensor is configured to sense the travelling status of the vehicle.

9. The method according to claim 8, further comprising:
   controlling, with the control unit, the clutching mechanism to operate in the engaging mode, in response to the travelling status indicating that the vehicle is accelerating; and
   controlling, with the control unit, the clutching mechanism to operate in one of (i) a sliding mode in which the first rotary shaft and the second rotary shaft are partially disengaged and (ii) a disengaging mode in which the first rotary shaft and the second rotary shaft are disengaged, in response to the travelling status indicating at least one of that the vehicle is turning and that the vehicle is travelling on a bisectional road.

10. The method according to claim 8, further comprising:
    controlling, with the control unit, in response to the travelling status indicating one of (i) that the vehicle is accelerating while at speed greater than the first predetermined threshold speed and (ii) that the vehicle is travelling at a constant speed greater than the first predetermined threshold speed, the first motor and the second motor together to operate in the driving mode; and
    controlling, with the control unit, in response to the travelling status indicating that the vehicle is braking while at a speed greater than the second predetermined threshold speed, the first motor and the second motor together to operate in the generating mode.

11. The method according to claim 8, wherein:
    an output power and an output torque of the first motor are larger than an output power and an output torque of the second motor,
    when only one of the first motor and the second motor is to be operated in the driving mode, the first motor is operated in the driving mode, and
    when only one of the first motor and the second motor is to be operated in the generating mode, the first motor is operated in the generating mode.

12. The vehicle driving system according to claim 1, the control unit being further configured to:
    control, in response to the travelling status indicating that the vehicle is accelerating, the clutching mechanism to operate in the engaging mode; and
    control, in response to the travelling status indicating at least one of that the vehicle is turning and that the vehicle is travelling on a bisectional road, the clutching mechanism to operate in one of (i) a sliding mode in which the first rotary shaft and the second rotary shaft are partially disengaged and (ii) a disengaging mode in which the first rotary shaft and the second rotary shaft are disengaged.

13. The vehicle driving system according to claim 1, the control unit being further configured to:
    control, in response to the travelling status indicating one of (i) that the vehicle is accelerating while at speed greater than the first predetermined threshold speed and (ii) that the vehicle is travelling at a constant speed greater than the first predetermined threshold speed, the first motor and the second motor together to operate in the driving mode; and
    control, in response to the travelling status indicating that the vehicle is braking while at a speed greater than the second predetermined threshold speed, the first motor and the second motor together to operate in the generating mode.

* * * * *